March 2, 1965     W. MOSS ETAL     3,171,146
THREAD SWAGING TAP
Filed March 22, 1962
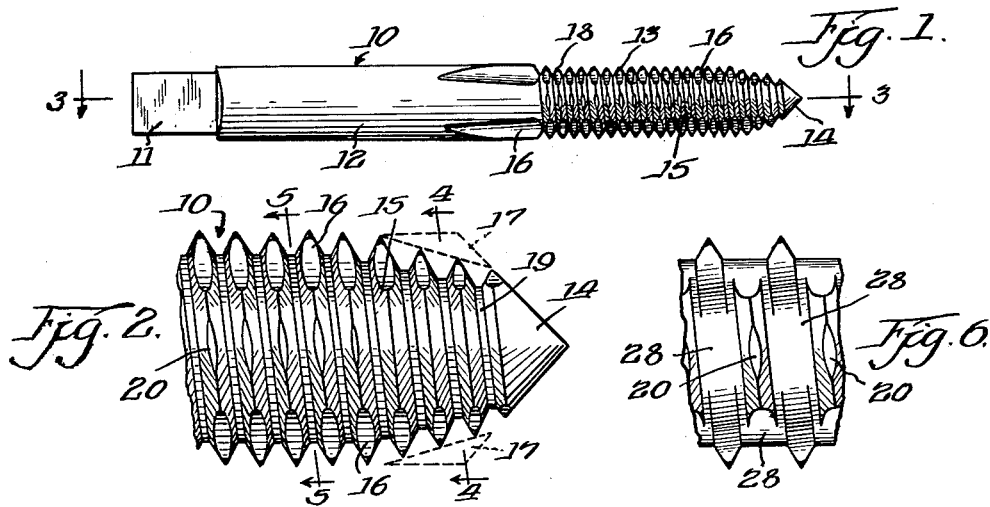
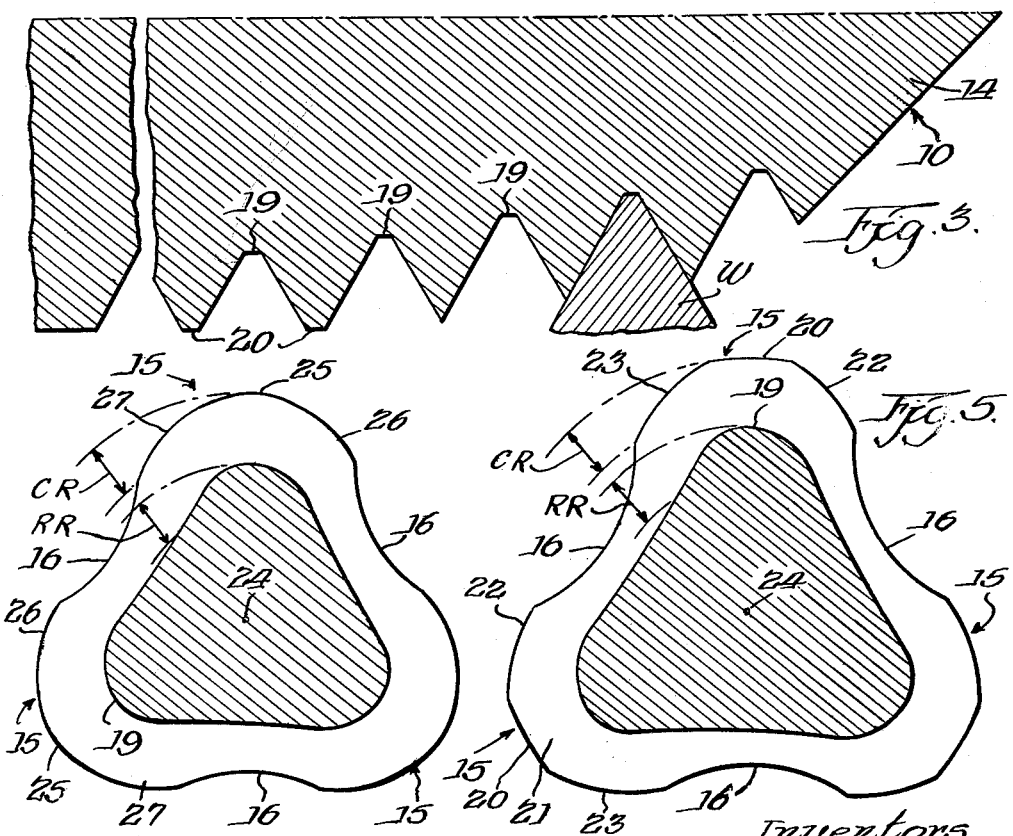

United States Patent Office 3,171,146
Patented Mar. 2, 1965

3,171,146
THREAD SWAGING TAP
Wilfred Moss, St. Johnsbury, and Everett L. King, Lyndon, Vt., assignors to Vermont American Corporation, Louisville, Ky., a corporation of Kentucky
Filed Mar. 22, 1962, Ser. No. 181,608
6 Claims. (Cl. 10—152)

The present invention relates to a threading tap, and more particularly to such a tap having a swaging action in forming a thread. It is particularly suited for non-ferrous metals though being useful also with certain types of steel.

A tap according to the invention is provided with a thread so formed as to form a thread in a bore without cutting, and to reduce to a minimum the torque required to operate the tap. Thus chips are eliminated, and the material is formed with a good, smoothly-finished thread of a consistent class of fit. Since tap life is related to torque, the tap has a greatly increased average life. The tap also reduces starting burr almost to the point of elimination, thus minimizing the time and labor involved in burr removal. Its structure is such that it is more economical to manufacture than many prior types.

It is an important object of the invention to provide a tap requiring very much less torque than prior taps, and therefor having greatly increased useful life.

Another object is the provision of a tap which forms a thread by a rolling or swaging action, without cutting of the material, and eliminates the formation of chips.

Another object is the provision of a tap which forms a thread with a good finish and smooth surfaces.

A further object is the provision of a tap which forms a thread of consistently uniform dimensions and hence of a consistent class of fit.

It is also an object of the invention to provide a tap which reduces starting burr to a minimum.

Another object is the provision of a tap which, while providing great advantages in the forming of threads not achievable by other taps, may nevertheless be manufactured economically.

A further object is the provision of a tap which by reason of novel advantageous results, cheapness, and long life, greatly increases the potential use.

It is also an object of the invention to provide a novel and advantageous method of forming a tap having the characteristics set forth above.

Other and further objects, advantages, and features of the invention will be apparent to those skilled in the art from the following detailed description, taken in conjunction with the accompanying drawings, in which:

FIGURE 1 is a side elevational view of a tap embodying the invention;

FIGURE 2 is an enlarged detail view of a portion of FIGURE 1;

FIGURE 3 is an enlarged fragmentary longitudinal sectional view showing the thread formation, taken substantially as indicated by the line 3—3 of FIGURE 1;

FIGURE 4 is an enlarged cross-sectional view taken substantially as indicated by the line 4—4 of FIGURE 2;

FIGURE 5 is an enlarged cross-sectional view taken substantially as indicated by the line 5—5 of FIGURE 2; and FIGURE 6 is a fragmentary view similar to a portion of FIGURE 2 but showing an interrupted thread.

Referring to the drawings, a tap according to the present invention is indicated generally at 10, comprising a conventional squared driving end 11, a cylindrical shank 12, and an initially cylindrical body 13. In the present instance, the tap is formed with a pointed end 14 on the body which serves as an external center in forming of the tap. A plurality of lands 15, in this case three, are formed in the body 13, defined by a like number of flutes 16 suitably formed in the tap blank prior to threading thereof, shown as of straight longitudinally extending form, although the flutes and lands may if desired be disposed in a helical form, for example. It will be understood that, while three flutes are shown in the illustrated tap, four, five, six or even eight might be employed in larger taps, as well as two flutes in smaller taps. The flutes extend from an area in the shank 12 to the end of the tap and thereby provide effective passage for lubricant and for release of otherwise trapped air. The flutes are not called upon to allow passage of chips, since no chips are formed by the tap in threading.

Adjacent the pointed end, the body 13 is formed in a conical or tapered shape, the length and degree of taper of the conical portion depending upon the particular type of tap. However, for convenience, "conical end" or "conical portion" will be used regardless of the length or degree of taper and even though the end may be truncated. In the present instance, a plug tap is illustrated, and the conical portion is approximately four threads long and of about 10° taper. When the thread to be formed is relatively coarse, the tap blank is provided with a taper adjacent the end 14 to minimize the material to be cut through in forming the thread. The taper is formed by the removal of a quantity of material 17 from the cylindrical body portion, as indicated in phantom in FIGURE 2, the taper corresponding substantially to the conical end portion desired in the tap. The body is provided with a back taper 18 which is substantially double the standard back taper, being from .001 to .002 inch per inch of length. This greater back taper lowers the torque required in tapping, and tends to prevent the tap from seizing in the material.

To produce the tap 10, the tap blank is formed with a thread by grinding as with a grinding wheel W profiled to a cut V-thread modified by having a flat root, as indicated in FIGURE 3. The opposite faces of the wheel diverge from the perimetral flat at an angle of 60° to each other, corresponding in this respect to the standard American National form of thread. The grinding wheel and tap blank are moved relative to each other to cut the thread groove radially inwardly of the original cylindrical surface of the body 13 and of the conical end formed by removal of the material 17. For purposes of description, it will be assumed that the wheel is moved along and about the blank, although it is to be understood that usually the blank is moved axially and radially of the wheel W.

Assuming that the wheel is engaged first with the central part of a land, it is moved radially inwardly to the desired thread depth, or in other words the standard depth of the American National thread form, and is moved around the blank toward one of the adjacent flutes 16, forming a flat root 19 (FIG. 3). As the wheel is moved toward the flute, it is also moved further radially inwardly to a maximum depth, so as to provide radial relief of the crest and root, as shown at CR and RR, respectively, in FIGURE 5. As the wheel passes through the flute, the rate of inward movement is relatively increased so that the wheel moves substantially chordally of the blank until it enters the next land and then moves outwardly approximately a third of the way through that land. At this point, the wheel is moved radially outwardly at a slower rate while continuing to move transversely of the land to substantially the central point, where it begins again to move radially inwardly as in the first land. The wheel W then moves substantially chordally toward the third land, and the grinding movement described above again takes place. This action is repeated for each land. As shown in FIGURE 5, the core assumes a generally triangular section with rounded corners, but if there were more or fewer than three flutes, then the core would have a correspondingly different cross-section. This grinding is continued throughout the length of the cylindrical portion of the body 13.

As will be evident, the central part 21 of each thread portion on each land has a flat crest 20, defined by the original or initial cylindrical blank surface, which is not completely removed by the wheel W by reason of the limited depth of its cut at this point and the spacing between cuts, i.e., the thread pitch. While this is referred to as a "flat" crest 20, that is not intended to mean it lies in a flat, single plane, since it is apparent that the flat crest defines a curved surface. The central thread part 21 of each land extends through approximately one-third of the width of the land, and the laterally adjacent, relieved leading and trailing thread parts 22 and 23, respectively, also extend each through about one-third of the land width. The leading and trailing parts 22 and 23 of each thread portion on the lands, extending from the end points of the flat crest portions 20 to the adjacent flutes 16, are sharp-crested throughout and have a cross section like an inverted V by reason of the greater radially inward penetration of the grinding wheel in forming these parts of the thread as above explained. The leading, or forming, part 22 is of shorter length than the trailing part 23, although the two may be made equal. The flat crest portion 20 of each central part 21 is of a shape, in plan view, which we refer to as "lenticular," i.e., narrowing along a convex line on either side from the center toward the ends of the central part as the depth of the thread increases, and merging with the sharp crests of the leading and trailing parts 22 and 23, as will be apparent from FIGURES 1 and 2. In FIGURES 1 and 2 the flat crests 20 are somewhat exaggerated so that they may be better seen. Usually the flat crest is narrower than shown. The flanks on either side of the thread adjacent the crest portion and adjacent the leading and trailing parts 22 and 23 approach each other gradually and smoothly without any abrupt change in direction of the surfaces of the flanks. Up to the point of merger with the sharp crests, the flat crest of lenticular shape constitutes the original outside surface of the blank. However, the thread depth increases so the crest is concentric, but the root is non-concentric about the axis 24 of the tap.

Grinding of the thread ordinarily begins at the smaller end of the conical portion, proceeding to the larger end and continuing along the cylindrical portion. The grinding wheel W in moving along and about the blank is moved more and more radially outwardly as it progresses toward the larger end of the conical portion, so that adjacent the end 14 it cuts most deeply through or relative to the original cylindrical surface of the blank, whether the cylindrical form has been retained or has been changed to a conical shape by removal of the material 17 as hereinbefore explained. The relative movement between the grinding wheel and the blank thus results in the cutting of the thread in a conical or expanding helix in the direction from the end 14 toward the shank 12, the thread continuing in a cylindrical helix from the large end of the conical portion or helix to the juncture of the tap body with the shank 12. In thus achieving the desired shape of the body, the thread on the lands of the conical portion is formed with a sharp V crest throughout, as will be evident from FIG. 3, because one of the angled surfaces cut by the wheel in each pass about the blank intersects with the oppositely angled surface formed by the adjacent cut or pass. However, we can provide flat crest portions even in the thread portions on the lands of the conical end of the tap.

On the conical portion of the tap, the thread portions of the lands have each a central part 25 which has its V crest and its root non-concentric about the tap axis, and has laterally adjacent leading and trailing parts 26 and 27 having the crest and root relieved radially inwardly substantially as shown in FIG. 4. The rest relief at the flute, that is, at the toe of each of the parts 26 and 27, is indicated at CR, and the root relief along the corresponding radius is indicated at RR. As will be best understood from FIGS. 2 and 3, the thread on the conical portion of the body is of the modified V-form previously mentioned, that is, a theoretical V-thread modified by the provision of the flat root portion 19. As will be noted from FIGURE 2, the root portion intersects and lies radially inwardly of the flutes 16, thus permitting distribution of lubricant. However, it is not essential that the root lie radially inwardly of the flutes.

The type of relative movement of the grinding wheel and tap blank in forming the threads on the conical portion is substantially the same as in forming the threads along the cylindrical portion of the body, the radially inward and outward movement of the wheel to provide the crest relief of the leading and trailing parts of the thread portions being generally as described. As shown in FIG. 4, the core retains generally the cross-sectional shape of the core in the cylindrical portion of the body. In both cases, however, the crest relief is sufficient to assure that no cutting of the material being threaded will occur, since the end faces of the thread portions at the flutes do not come into contact with the material. The grinding of the thread completes the formation of the tap 10. It may be noted that the thread grinding operation on the cylindrical portion of the body simultaneously relieves the outer diameter of the tap, only the flat crests 20 being left of the original cylindrical surface.

It will be understood that although in the present instance the relieved root is shown as lying radially inwardly of the flutes so as to define grooves crossing the bottoms of the flutes, it is not necessary to the invention that this be the case. Whether the root portion of the thread defines a groove extending across the bottoms of the flutes depends in any particular instance upon a number of different factors, such as the depth of the flutes and the degree of root relief.

In use, as the tap is inserted into a bore to be threaded, the sharp-crested thread portion adjacent the pointed end 14 engages the bore surface, contact being made at a point located radially between the crest of the central part 25 and the outer end of the crest of the leading part 26. The sharp edge of the leading part 26, and then of the central part 25, swages the material aside to form the initial thread groove, the tap having a maximum pitch diameter smaller than the diameter of the bore to be threaded. The sharp V-threads on the conical end portion allow the tap to pick up its own lead quickly and easily, thus reducing the size of the starting burr and preventing bell-mouthing and stripping of threads. As the tap advances into the bore, the thread portions on the conical end, of progressively increasing diameter, deepen the thread groove formed in the bore surface, which as is obvious is in the form of a V, the swaged material being forced into the thread grooves of the tap substantially as in a thread-rolling operation. As the last or transitional thread portions on the conical body portion pass along the bore, formation of the American National form of thread is begun by a small transitional flat crest 20 thereon, and is completed by the first full thread on the cylindrical portion of the body 13, the central thread parts 21 of which, with larger flat crest portions 20 thereon, widen and complete the thread groove and the flat root thereof. The end point, or toe, of the leading sharp-crested relieved portion 22 does not contact the material, since it merely moves centrally of the V-groove already formed in the bore, and is located radially inwardly of the apex of the groove. The thread is substantially completely formed in the bore by the thread portions on the conical portion and the first full central part 21 having a flat crest 20, the succeeding thread portions having basically only a "sizing" or finishing action to assure that the thread formed in the bore is of correct dimensions and section.

The torque requirements of the present tap are greatly reduced over taps previously provided, by reason of the sharp V-threads on the conical body portion and adjacent the flat-crested central thread parts 21, so that only a minimum of blunt, flat surfaces are provided and employed to operate on the material. In addition, the limitation of the thread-forming or swaging portions to a relatively small proportion of the circumference of the tap results in only a small area of contact between the tap and the surface being threaded, and consequent low friction. The provision of the flutes 16 also results in reduction of the contact area, and by allowing lubrication of the thread portions, particularly those on the conical portion of the body, further lowers the torque. If desired, the torque may be still further reduced by employing an interrupted thread on the tap. Such an interrupted thread extending along the cylindrical body portion is illustrated in FIGURE 6 at 28.

The lowering of torque, and hence increased tap life, the ready pick-up of its lead by the tap thereby minimizing starting burr, and the elimination of chip cutting by provision of the crest and root reliefs as explained, have been described hereinabove. Other advantageous results of the tap construction not necessarily obvious from the foregoing disclosure, however, may be made plain. Thus, the transition from a modified V-thread to the American National thread form on the tap results in a gradual forming of the desired thread section in the material threaded, which gradual forming produces a smooth-flanked, substantially finished thread, particularly in view of the provision of flutes to carry lubricant to the critical areas of the tap. This gradual forming of the thread in the material to the desired form, together with the lower torque, provision for lubrication, easier starting and pick-up of lead, and less loading of the material, also results in consistently forming the thread with the desired class of fit. It should also be noted that the lower torque requirements permit the tap to be used with materials which heretofore caused taps to break because of high torque. Similarly, the provision for lubrication made by the flutes allows the tap to be used with materials which previously would "weld" to or "load" on the tap. It has already been pointed out that no separate relief grinding of the outer diameter of the tap is required. By eliminating this expensive operation, the cost of the present tap is kept at a lower level.

It is to be understood that while the invention is disclosed as employed to provide a thread of the standard American National form, it is not restricted to any one form of thread but may be applied to the formation of almost any thread. For purposes of illustration, the commonly used American National thread has been selected.

The invention is not limited to taps, since the principle disclosed herein may be applied to threading dies as well. The same basic thread form as employed in the tap can be used in a die, and the operation would be the same, the only important difference lying in the reversing involved in internal application to a die instead of external application to a tap.

It is to be understood that the foregoing disclosure of the invention is illustrative and exemplary, and that the invention is not limited to the specific embodiment shown and described, since many modifications and changes may be made therein without departing from the inventive concept.

We claim:

1. A thread-swaging tap comprising a generally cylindrical body having a plurality of lands formed thereon by a plurality of flutes, a threat on the body including a V-thread modified to include a flat root portion the V-thread extending from one end of the body in a helix expanding substantially uniformly to define a threaded conical portion on the body and an American National thread extending in a cylindrical helix from the large end of said expanding helix of the modified V-thread with which it merges to define a threaded cylindrical portion on the body, said threads being defined by thread portions on each land, each thread portion of the American National thread on the lands of the cylindrical portion of the body at the central part of the land having a flat shaped crest concentric and its root non-concentric about the tap axis, each thread portion of said lands also having the part at the leading side of said central part of sharp V-shaped crest and radially relieved a distance such as to space its sharp V-shaped crest radially inwardly of the flat-shaped crest of its central thread part a sufficient distance to be disposed out of contact with the surface of a bore to be threaded by the tap, and the crest of the modified V-thread portions on the conical portion of the body being sharp throughout the extent thereof.

2. A thread-swaging tap comprising a body having a plurality of lands formed thereon, and a thread on the body extending in an expanding helix from one end thereof to define a threaded conical portion on the body and continuing from the large end of the expanding helix toward the other end of the body in a cylindrical helix to define a threaded cylindrical portion in the body, said thread being defined by thread portions each of which at the central part of a land on at least the cylindrical portion of the tap body have a flat crest concentric about the tap axis and a root non-concentric about the tap axis, each thread portion also having at the leading side of said central part a part having a sharp V-shaped crest radially relieved a distance such as to space the leading portion of its crest radially inwardly relative to the flat crest of the central part a sufficient distance to be disposed out of contact with the surface of a bore threaded by the tap, said flat crest of the central part diminishing in width and merging with said sharp V-shaped crest of the leading part.

3. A thread-swaging tap comprising a generally cylindrical body portion having a conical end portion, said portions having a plurality of lands formed thereon by a plurality of flutes, and a thread defined by thread portions extending across said lands, the thread portions on the cylindrical body portion and at the transitional end of the conical portion having a flat crest portion defining a curved surface concentric with the longitudinal axis of the tap and diminishing in width toward the leading part of the lands, the leading part of said thread portions having a radially relieved sharp V-shaped crest into which said diminishing width of the flat crest portion merges, and the thread portions on the conical portion having a sharp V-shaped crest.

4. The tap of claim 3 wherein the flat crest portion displays a generally lenticular shape in outline with its width diminishing in the direction of both the leading and trailing parts of the land and merging into V-shaped crest portions of said parts which constitute radially relieved portions of the thread.

5. The tap of claim 3 wherein the thread between flutes on the coincal end is radially relieved at least on the leading side of its central portion.

6. The tap of claim 3 wherein at least a portion of the root of the thread intersects and lies radially inwardly of the flutes.

References Cited by the Examiner

UNITED STATES PATENTS

| | | | |
|---|---|---|---|
| 419,385 | 1/90 | Vaughan | 10—141 |
| 2,352,982 | 7/44 | Tomalis | 10—152 |
| 2,536,864 | 1/51 | Strickland et al. | 51—288 |
| 2,703,419 | 3/55 | Barth | 10—152 |
| 2,807,813 | 10/57 | Welles | 10—152 |
| 2,918,038 | 4/61 | Flanders | 51—288 |
| 2,991,491 | 7/61 | Welles | 10—152 |
| 3,050,755 | 8/62 | Welles | 10—152 |
| 3,131,407 | 5/64 | Roberts | 10—152 |

ANDREW R. JUHASZ, *Primary Examiner.*